United States Patent [19]

Janiszewski

[11] Patent Number: 5,517,874
[45] Date of Patent: May 21, 1996

[54] MOTOR VEHICLE GEARBOX WITH BRAKE MEANS IN COUNTERSHAFT AND UNEQUAL GEAR TEETH ON GEARS OF DUAL COUNTERSHAFTS

[75] Inventor: Grzegorz Janiszewski, Angered, Sweden

[73] Assignee: AB Volvo, Gothenburg, Sweden

[21] Appl. No.: 271,621

[22] Filed: Jul. 7, 1994

[30] Foreign Application Priority Data

Jul. 7, 1993 [SE] Sweden .................................. 9302359

[51] Int. Cl.⁶ .......................... F16H 55/12; F16H 55/18; F16H 3/08
[52] U.S. Cl. .................. 74/325; 74/331; 74/409; 74/440; 74/DIG. 10
[58] Field of Search .............................. 74/325, 329, 331, 74/409, 440, DIG. 10; 188/83

[56] References Cited

U.S. PATENT DOCUMENTS

| | | | |
|---|---|---|---|
| 2,701,476 | 2/1955 | Keese | 74/325 |
| 3,013,440 | 12/1961 | White | 74/443 |
| 3,093,007 | 6/1963 | Aebersold | 74/325 |
| 3,355,909 | 12/1967 | Russey et al. | 74/325 |
| 3,398,594 | 8/1968 | Keller | 74/443 |
| 3,452,611 | 7/1969 | Simpson | 74/443 |
| 3,485,109 | 12/1969 | Dunlap | 74/409 |
| 4,063,466 | 12/1977 | Showalter | 74/331 X |
| 4,257,284 | 3/1981 | Ashauer et al. | 74/329 X |
| 4,519,264 | 5/1985 | Inui | 74/440 X |
| 4,881,422 | 11/1989 | Maguire | 74/409 X |
| 4,916,960 | 4/1990 | Inui et al. | 74/331 |

*Primary Examiner*—Khoi Q. Ta
*Attorney, Agent, or Firm*—Young & Thompson

[57] ABSTRACT

Motor vehicle gearbox with an input shaft (2), two countershafts (3,4) and an output shaft (5). On the first countershaft (4) there is a rotatable gear (30) which cooperates with brake elements through which a frictional torque is transmitted via a gear (10) on the output shaft to the second countershaft (3) and from the second countershaft to the output shaft (5) and back to the first countershaft (4).

6 Claims, 1 Drawing Sheet

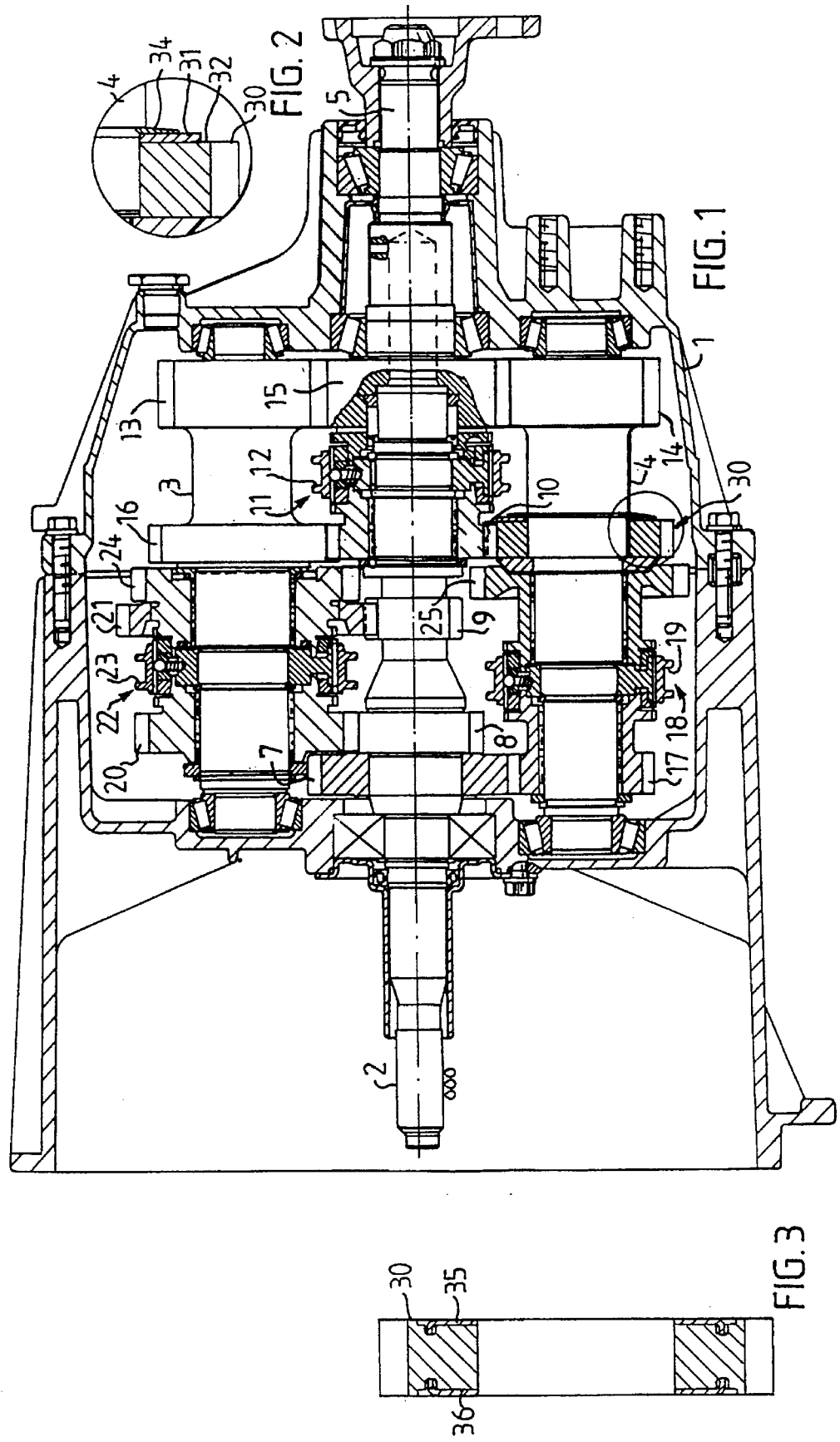

5,517,874

MOTOR VEHICLE GEARBOX WITH BRAKE MEANS IN COUNTERSHAFT AND UNEQUAL GEAR TEETH ON GEARS OF DUAL COUNTERSHAFTS

FIELD OF THE INVENTION

The present invention relates to a motor vehicle gearbox comprising an input shaft, two countershafts, which arc alternately driveable via gears carried on the input shaft and respective countershaft, at least one gear in each cooperating gear pair being releasable, and an output shaft, carrying a gear in engagement with gears non-rotatably fixed on each countershaft.

BACKGROUND OF THE INVENTION

In most automobiles with a manual transmission, transmission rattle occurs. The noise arises when freely rotating gear teeth strike each other at a certain frequency when they are accelerated in the gearbox due to non-uniform running of the engine at low rpm. The oscillations occurring are promulgated via the clutch and the input shaft and are due not only to the engine but also to the drag force of the gearbox. The engine flywheel has a greater angular acceleration and oscillation amplitude at low rpm, so that the rattle increases in most cases as the engine speed is reduced.

Several different methods of reducing or completely eliminating rattle in gearboxes are known. It is possible for example to use clutches of special stiffness and damping, to increase the moment of inertia of the flywheel or to decrease the backlash between the gears. For considerations of function and production, it is not possible to reduce the backlash enough to achieve effective damping.

A number of the abovementioned disadvantages are eliminated by an arrangement in which one gear in a pair of interengaging gears has a hub portion on which a gear in the form of thin disc with the same gear-tooth shape and number of gears as the gear itself is rotatably mounted. Between the gear and the gear disc there is mounted a spring element which is biased towards the engaging position of the gears. Such an arrangement is inexpensive to manufacture, has high efficiency and makes it possible due to its damping to avoid the effect of the inherent frequency of the transmission components.

However, this arrangement has certain limitations: firstly, the backlash is only eliminated between those gear pairs which have a gear with a biased gear disc and, secondly, such a gear disc cannot for practical production reasons, be disposed on that side of a gear which has coupling teeth for engagement with an engaging sleeve, which to a certain extent can limit the freedom of design of a gearbox.

SUMMARY OF THE INVENTION

The purpose of the present invention is to provide a gearbox of the type described by way of introduction with a simple device which can eliminate backlash between several sets of gears on three shafts.

This is achieved according to the invention by virtue of the fact that a releasable gear on the input shaft engages two gears, each mounted on an individual countershaft, said two gears not having the same number of teeth and one of said two gears being rotatably mounted on its shaft and interacting with brake means carried by said same shaft.

A gearbox of this type provides, with the aid of a braked gear, a braking torque between all the shafts in the gearbox in all gear speeds.

The invention has been developed primarily, but not exclusively, for five-speed gearboxes, in which there is a "vacant" spot on one of the countershafts, which is only used for torque transmission for fifth gear and reverse. A braked gear can be arranged here in engagement with the disengageable gear mounted on the input shaft which engages the gear for the third gear speed on the other countershaft.

BRIEF DESCRIPTION OF THE DRAWINGS

The invention will be described in more detail with reference to examples shown in the accompanying drawings, where FIG. 1 shows a longitudinal section through a gearbox according to the invention, FIG. 2 is an enlargement of the encircled area in FIG. 1 and FIG. 3 is a longitudinal section through a modified embodiment of the braked gear.

DETAILED DESCRIPTION OF THE INVENTION

In the Figure, 1 designates the housing of a five-speed motor vehicle gearbox, which has an input shaft 2, a first countershaft 3, a second countershaft 4 and an output shaft 5.

The input shaft 2 engages a clutch and has first and second gears 7 and 8, respectively, fixed to the shaft, a gear rim 9 milled directly into the shaft and a rotatably mounted gear 10, which can be locked to the shaft by means of a coupling and synchronizing device, generally designated 11, which comprises an axially displaceable engaging sleeve 12. With the aid of the coupling device 11, the input shaft 2 and the output shaft 5 can be locked together as a unit for direct drive.

Each of the countershafts 3, 4 has an individual non-rotatably fixed gear 13 and 14, respectively, which engages a gear 15 non-rotatably fixed on the output shaft 5. These two gears 13 and 14 are of identical size. The first countershaft 3 has a non-rotatably fixed gear 16 which engages the rotatably mounted gear 10 on the input shaft 2.

The gear 7 on the input shaft 2 engages a gear 17 freely rotatably mounted on the second countershaft 4 and can be locked, via an engaging means, generally designated 18, and comprising an axially displaceable engaging sleeve 19, to the countershaft 4. Each of the gears 8 and 9 on the input shaft 2 engages an individual gear 20 and 21, respectively freely rotatably mounted on the first countershaft 3. Said freely rotatably mounted gear 20 and 21 can be alternately locked to the shaft 3 by means of an engaging means, generally designated 22, comprising an axially displaceable engaging sleeve 23. The gear 21 is combined with a gear 24 engaging a gear 25 (the shafts 2, 3 and 4 are arranged in a V-shape), which is freely rotatably mounted and to be locked to the shaft 4 by means of the engaging means 18.

Torque is transmitted in the various gear speeds along the following paths:

First: gears 9, 21, 13 and 15

Second: gears 8, 20, 13 and 15

Third: gears 10, 16, 13 and 15

Fourth: direct drive shaft 2 to shaft 5

Fifth: gears 7, 17, 14 and 15

Reverse: gears 9, 21, 24, 25, 14 and 15.

According to the invention, the second countershaft 4 carries a gear (generally designated 30), which engages the gear 10 and has a different number of teeth than the gear 16, suitably one more or one less tooth than the gear 16. The gear 30 is rotatably mounted on the countershaft 4. A friction leaf disc 31 is non-rotatably fixed to the shaft 4 and is axially loaded towards a lateral surface 32 of the gear 30 by a conical spring washer 34, which is axially fixed in a groove in the shaft.

Since the gears 13 and 14 have an identical number of teeth, while the gears 16 and 30 do not have the same number of teeth, there will occur a certain relative rotation between the gear 30 and the countershaft 4. The frictional torque which the relative rotation gives rise to between the leaf disc 31 and the lateral surface 32 of the gear creates a bias which eliminates the backlash between the gears 10 and 16, 13 and 15, 15 and 14, as well as between 30 and 10. The frictional torque does not affect the synchronizing forces, since all the biased gears are coupled to the output shaft 5 of the gearbox.

In the example shown in FIGS. 1 and 2, the gear 30 is a common machined metal gear, the side 32 of which facing the leaf disc 31 forms a frictional surface. However, tests have shown that the relatively low frictional torque required, on the order of 10–15 Nm, makes it possible to manufacture the gear 30 in a suitable plastics material, and the frictional surface facing the leaf disc 31 consists of a metal disc 35 fixed to the gear. A corresponding metal disc 36 is fixed to the opposite side of the plastic gear 30.

I claim:

1. In a motor vehicle gearbox, comprising an input shaft, two countershafts, which are alternately driveable via gears carried on the input shaft and respective countershaft, at least one gear in each cooperating gear pair being releasable, and an output shaft, carrying a gear in engagement with gears non-rotatably fixed on each countershaft, the improvement wherein a releasable gear on the input shaft engages two gears, each mounted on an individual countershaft, said two gears not having the same number of teeth, a first of said two gears being rotatably mounted on its countershaft and interacting with brake means carried by said countershaft, and the second of said two gears being fixed on its countershaft.

2. Gearbox according to claim 1, wherein the brake means comprise a friction element non-rotatably joined to the countershaft, said friction element being spring-biased towards a friction surface on said gear.

3. Gearbox according to claim 2, wherein the friction element is a disc of a frictional material which is biased against a surface on the gear by a spring washer axially fixed in a groove in the countershaft.

4. Gearbox according to claim 2, wherein said gear is made of plastic and wear layer of another material on its side facing the friction element.

5. Gearbox according to claim 1, wherein said two gears not having the same number of teeth differ in number by one tooth.

6. Gearbox according to claim 1, having five forward gear speeds and one reverse, and wherein torque in first, second and third gear is transmitted via the first countershaft and in fifth gear and reverse via the second countershaft, and the gear interacting with the brake means is arranged on said second countershaft.

\* \* \* \* \*